United States Patent
Pratt et al.

(10) Patent No.: US 9,264,903 B2
(45) Date of Patent: *Feb. 16, 2016

(54) USER IDENTIFICATION IN CELL PHONES BASED ON SKIN CONTACT

(71) Applicant: AT&T Intellectual Property I, L.P., Atlanta, GA (US)

(72) Inventors: James Pratt, Round Rock, TX (US); Sarah Everett, Cedar Park, TX (US); Marc Sullivan, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/538,745

(22) Filed: Nov. 11, 2014

(65) Prior Publication Data

US 2015/0133086 A1 May 14, 2015

Related U.S. Application Data

(63) Continuation of application No. 12/205,430, filed on Sep. 5, 2008, now Pat. No. 8,913,991, which is a continuation-in-part of application No. 12/192,656, filed on Aug. 15, 2008, now abandoned.

(51) Int. Cl.
*H04M 1/66* (2006.01)
*G06F 21/00* (2013.01)
*H04W 12/06* (2009.01)
(Continued)

(52) U.S. Cl.
CPC .............. *H04W 12/06* (2013.01); *G06F 1/3203* (2013.01); *G06F 1/3231* (2013.01); *H04L 63/0861* (2013.01); *H04M 1/72563* (2013.01); *H04W 52/027* (2013.01); *H04W 52/0254* (2013.01); *H04M 1/67* (2013.01); *H04M 2250/12* (2013.01); *H04M 2250/22* (2013.01); *H04W 52/0258* (2013.01); *Y02B 60/1289* (2013.01)

(58) Field of Classification Search
CPC ..................................................... G06F 19/3406
USPC ........................................... 455/411; 713/186
See application file for complete search history.

(56) References Cited

U.S. PATENT DOCUMENTS 5,875,327 A 2/1999 Brandt et al.
5,892,447 A 4/1999 Wilkinson et al.
(Continued)

OTHER PUBLICATIONS

Office Action mailed Jun. 9, 2011 for U.S. Appl. No. 12/192,656, 25 pages.

(Continued)

*Primary Examiner* — Omoniyi Obayanju
(74) *Attorney, Agent, or Firm* — Amin, Turocy & Watson, LLP

(57) ABSTRACT

Screen time-outs on a portable electronic device can be customized based on user activity. In one aspect, a sensing component receives data from one or more sensors located on the portable electronic device, for example, skin conductivity sensors and determines whether the user is using the portable device, either actively or passively and also determines the identity of the user. A configuring component is employed to change one or more features or functions of the portable electronic device based on the information determined by the sensing component. In particular, the configuring component changes one of more features of the portable electronic device based on the preferences predefined by the identified user and device usage (active and passive usage).

20 Claims, 12 Drawing Sheets

(51) Int. Cl.
*G06F 1/32* (2006.01)
*H04L 29/06* (2006.01)
*H04W 52/02* (2009.01)
*H04M 1/725* (2006.01)
*H04M 1/67* (2006.01)

(56) References Cited

U.S. PATENT DOCUMENTS

| | | |
|---|---|---|
| 6,822,635 B2 | 11/2004 | Shahoian et al. |
| 7,159,120 B2 | 1/2007 | Muratov et al. |
| 7,212,835 B2 | 5/2007 | Mantyjarvi et al. |
| 7,319,457 B2 | 1/2008 | Lin et al. |
| 7,633,076 B2 | 12/2009 | Huppi et al. |
| 7,653,883 B2 | 1/2010 | Hotelling et al. |
| 7,876,310 B2 | 1/2011 | Westerman et al. |
| 8,013,839 B2 | 9/2011 | Ording et al. |
| 8,160,431 B2 | 4/2012 | Nomura et al. |
| 2002/0190962 A1 | 12/2002 | Miura |
| 2003/0051182 A1* | 3/2003 | Tsirkel et al. ............ 713/320 |
| 2003/0076298 A1 | 4/2003 | Rosenberg |
| 2005/0219223 A1 | 10/2005 | Kotzin et al. |
| 2006/0026521 A1 | 2/2006 | Hotelling et al. |
| 2006/0111093 A1 | 5/2006 | Shim et al. |
| 2006/0132060 A1 | 6/2006 | Chen |
| 2006/0164241 A1 | 7/2006 | Makela et al. |
| 2006/0244735 A1 | 11/2006 | Wilson |
| 2007/0057925 A1 | 3/2007 | Hung |
| 2007/0075965 A1 | 4/2007 | Huppi et al. |
| 2007/0085157 A1 | 4/2007 | Fadell et al. |
| 2007/0085671 A1 | 4/2007 | Martin et al. |
| 2007/0096869 A1* | 5/2007 | Trohler ................ 340/5.52 |
| 2007/0239933 A1 | 10/2007 | Miki |
| 2007/0273658 A1 | 11/2007 | Yli-Nokari et al. |
| 2007/0280446 A1 | 12/2007 | Hsieh et al. |
| 2007/0287494 A1 | 12/2007 | You et al. |
| 2008/0024958 A1 | 1/2008 | Mudd et al. |
| 2008/0148030 A1* | 6/2008 | Goffin ................ 713/1 |
| 2008/0148395 A1 | 6/2008 | Brock |
| 2008/0214289 A1 | 9/2008 | Pryzby et al. |
| 2008/0218309 A1* | 9/2008 | Steenstra et al. ........ 340/5.8 |
| 2008/0220829 A1 | 9/2008 | Akama et al. |
| 2008/0300027 A1 | 12/2008 | Dou et al. |
| 2008/0316181 A1 | 12/2008 | Nurmi |
| 2009/0003620 A1* | 1/2009 | McKillop et al. ........ 381/80 |
| 2009/0117951 A1 | 5/2009 | Alameh et al. |
| 2009/0140863 A1 | 6/2009 | Liu et al. |
| 2009/0166098 A1 | 7/2009 | Sunder |
| 2009/0215385 A1* | 8/2009 | Waters et al. ........... 455/1 |
| 2009/0295714 A1 | 12/2009 | Erickson |
| 2010/0045621 A1 | 2/2010 | Kang et al. |
| 2010/0050002 A1 | 2/2010 | Huang |
| 2010/0056272 A1 | 3/2010 | Dutilly et al. |
| 2010/0085313 A1 | 4/2010 | Rider |
| 2011/0043227 A1 | 2/2011 | Pance et al. |
| 2011/0056108 A1 | 3/2011 | McCord et al. |
| 2011/0126119 A1 | 5/2011 | Young et al. |
| 2015/0045632 A1* | 2/2015 | Bagan ................ 600/301 |

OTHER PUBLICATIONS

Office Action dated Nov. 1, 2011 for U.S. Appl. No. 12/205,430, 25 pages.
Office Action dated Nov. 7, 2011 for U.S. Appl. No. 12/192,656, 30 pages.
Office Action dated Jun. 8, 2011 for U.S. Appl. No. 12/205,430, 21 pages.
Office Action dated Feb. 29, 2012 for U.S. Appl. No. 12/192,656, 32 pages.
Office Action dated Jun. 25, 2012 for U.S. Appl. No. 12/192,656, 42 pages.
Office Action dated Mar. 14, 2013 for U.S. Appl. No. 12/192,656, 34 pages.
Office Action dated Sep. 24, 2013 for U.S. Appl. No. 12/192,656, 43 pages.

* cited by examiner

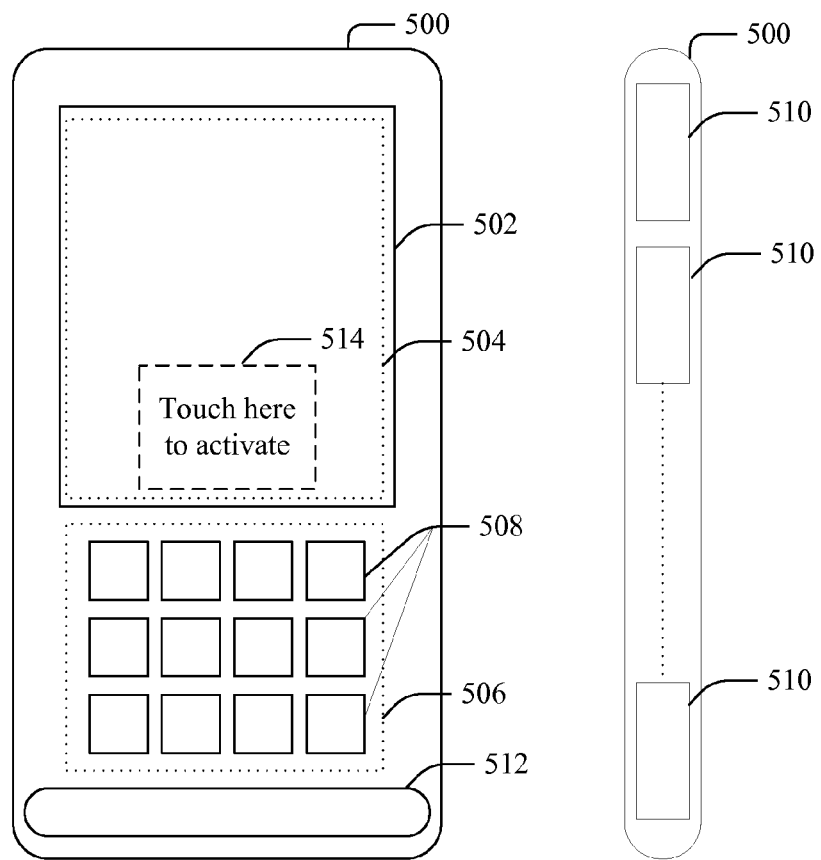
FIG. 5 A   FIG. 5 B
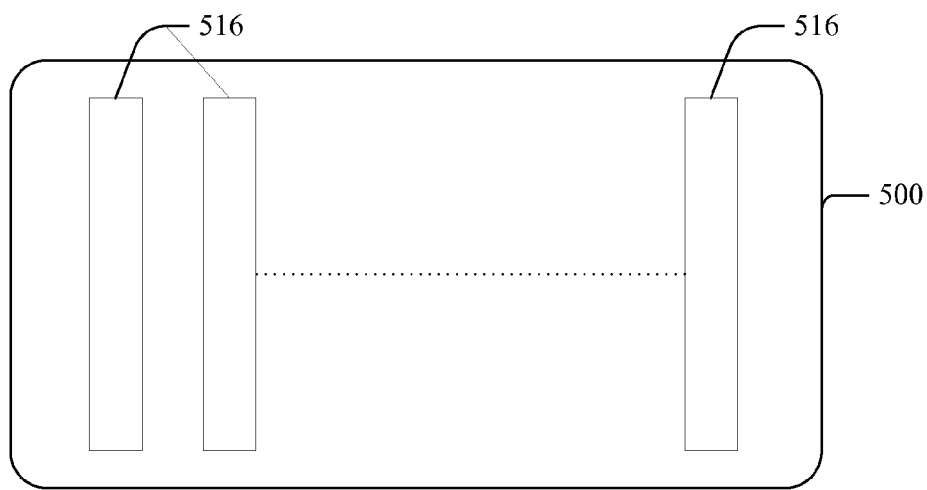
FIG. 5 C
FIG. 5

USER IDENTIFICATION IN CELL PHONES BASED ON SKIN CONTACT

CROSS-REFERENCE TO RELATED APPLICATIONS

This application is a continuation of, and claims the benefit of priority to each of, U.S. patent application Ser. No. 12/205,430 (now U.S. Pat. No. 8,913,991), entitled "USER IDENTIFICATION IN CELL PHONES BASED ON SKIN CONTACT," filed on Sep. 5, 2008, which is a continuation-in-part of U.S. patent application Ser. No. 12/192,656, filed on Aug 15, 2008, entitled "CELLPHONE DISPLAY TIMEOUT BASED ON SKIN CONTACT" (now abandoned). The entireties of each of the above noted applications are incorporated herein by reference.

BACKGROUND

Mobile communication technology is rapidly advancing the exchange of information between users and systems. The user is no longer tied to a stationary device such as a personal computer in order to communicate with another user, listen to music, or watch a video. Further, portable phones (and other portable devices) can be utilized as full-service computing machines. For example, many of the most recent and advanced mobile phones can be associated with word processing software, accounting software, and various other types of software. Portable wireless devices such as cell phones and PDAs (personal digital assistants), example, employ various power management techniques to extend battery life and support additional computations.

In particular, portable wireless devices, such as cell phones, remain switched on most of the time, such that, they can receive incoming calls at any time and the desire for longer operational time periods between battery recharge cycles has increased. With advances in portable device technology, newer devices are substantially smaller, but still incorporate additional features and functions that consume more battery power. Although new battery technologies, for example lithium-ion batteries, that are being employed improve the battery life, consumer demand for longer life batteries is on the increase.

Conventionally, techniques for extending mobile device battery life include entering a sleep mode if the device is inactive for a predetermined period of time. Most often, conventional systems dim or time-out display screens to save battery power. However, the screen time-out is based on a fixed setting in the device and/or can be driven by an off-or-on setting within a software. A few conventional systems allow a user to enter a user-defined time-out period; however, the user defined screen time-out is constant and cannot be optimized to efficiently conserve battery power. This leads to user frustration since either the user may be using the phone, actively or passively, even after the predefined screen time-out period has elapsed. Further, in multiuser scenarios, wherein multiple users can utilize the device, power management features cannot be customized for each user.

BRIEF DESCRIPTION OF THE DRAWINGS

FIGS. 5A-5C illustrate example views of a portable electronic device that can optimize activation of device features based on device usage, according to an aspect of the subject disclosure.

DETAILED DESCRIPTION

Figure 1:
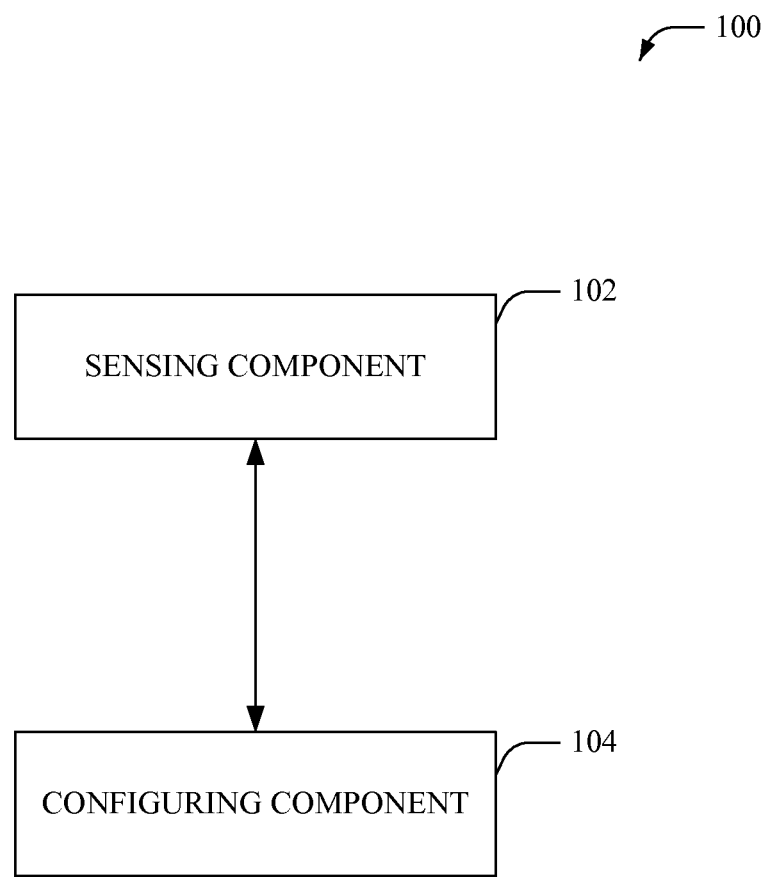
FIG. 1 illustrates an example system that can facilitate changing of settings on a portable electronic device in an optimal manner, according to an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Inference can also refer to techniques employed for composing higher-level events from a set of events or data. Such inference can result in the construction of new events or actions from a set of observed events and/or stored event data, whether or not the events are correlated in close temporal proximity, and whether the events and data come from one or several event and data sources. Various classification schemes and/or systems (for example, support vector machines, neural networks, expert systems, Bayesian belief networks, fuzzy logic, data fusion engines, or other similar systems) can be employed in connection with performing automatic and/or inferred actions.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). The terms "mobile device", "portable device", "device" are used interchangeably herein and are intended to refer to most any portable electronic device such as, but not limited to a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem, a media player, a media recorder, a camera, etc., or a combination thereof.

Conventional systems employ various power management techniques to preserve battery life of portable devices, such as, but not limited to cell phone, music players, cameras, etc. As an example, conventional systems dim or time-out display screens on the portable device when the device is not in use by employing a fixed time-out period. However, the screen time-out is not optimized to conserve maximum battery power based on device usage. Furthermore, screen time-out cannot be customized for multiple users based on user preferences.

Systems and/or methods are presented herein that can efficiently manage power in portable electronic devices and customize power management for each user, for example, by optimizing screen time-outs. In particular, the system employs skin conductivity sensors to determine if a user is touching the device and identify the user touching the device. Based on the data from the skin conductivity sensors, the system determines whether the portable device should be in an active state or an inactive state and accordingly optimizes screen time-outs.

The systems and methods disclosed herein, in one aspect thereof, can facilitate optimizing a display screen time-out of a portable electronic device based on device usage by a particular user. Touch sensitive sensors, for example, skin conductivity sensors, can be employed to determine if a user is in contact with the portable electronic device. Further, a sensing component can determine whether the user is currently using the device, either actively or passively. Furthermore, an identification component can determine the identity of the user using the device. Additionally, a configuring component can change one or more device functions based on the preferences of the identified user, such as display screen time-outs, when a user stops using the portable electronic device. In one aspect, the configuring component can restore the one or more device functions to their original values when the user starts using the portable electronic device (either actively or passively). Moreover, the portable electronic device can identify a user interacting with the device and optimize the one or more device functions based on user identification.

In accordance with another aspect of the system, a time-out determining component can be employed to optimize a screen time-out of the portable electronic device. The time-out determining component can start or stop a screen time-out based on data received from one or more sensors, for example, skin conductivity sensors, located on the portable electronic device. In particular, the time-out determining component can initiate a display screen time-out when the user is not using the portable device (actively or passively). Thus, during the time that the user is not employing the device, the time-out determining component can dim or switch off a display screen. In addition, when the user starts actively or passively employing the portable device, the time-out determining component can switch on the display screen or restore the display screen to the original brightness. Further, the time-out settings can be customized by a user and applied when the particular user employs the device.

Another aspect of the subject disclosure comprises a current mode determining component that can determine a current mode of operation for the portable electronic device based on the data received from one or more sensors, for example, skin conductivity sensors. The current mode determining component can change the current mode of operation of the portable device based on whether the identified user is currently utilizing the portable device and/or preferences set by the identified user. The utilization of the portable device can be active or passive and can be determined based in part on the user's contact with the portable electronic device. Thus, the current mode determining component can change the current operating mode of the portable device to a preferred mode based on the device usage, without an active indication from the user.

Still another aspect of the system comprises a current setting determining component that modifies one or more settings of the portable device based on the device usage. It can be appreciated that the settings are not limited to power saving options but can be a setting for most any feature of the portable electronic device. Further, the change in settings can be based on, for example, a predefined user preference configured via a user input or can be automatically determined by a machine learning technique. Thus, the current setting determining component changes settings for one or more features or functions of the portable device based in part on whether the user is currently using (actively or passively) the portable device. Moreover, each user can predefine the one or more features or functions that can be changed when determined that the particular user is utilizing the portable device.

Yet another aspect of the disclosed subject matter relates to a method that can be employed to change settings on a mobile device based on device usage. In one aspect, it can be sensed that skin is no longer in touch with the mobile device and the identity of the user that stopped touching the mobile device can be determined. Further, a time-out can be started based on the preferences of the identified user, such that a display screen on the portable electronic device can be either dimmed or switched off to conserve battery power. Furthermore, most any power saving features can be activated based on the time-out. In addition, one or more settings of the mobile device can be changed based in part on the user's preferences. In another aspect, it can be sensed that skin in now in contact with the mobile electronic device and the user touching the device can be identified. Based on the preferences of the identified user, the time-out can be stopped. The display screen on the mobile device can be switched on or restored to its original brightness and one or more settings on the mobile device can be changed or reset to an original value since it is determined that the user is currently using the device.

Referring initially to FIG. 1, illustrated is an example system 100 that can facilitate a change in settings of a portable electronic device in an optimal manner, according to an aspect of the subject specification. The portable electronic device can be most any mobile device, such as, but not limited to, a cell phone, a media player, a camera, a voice recorder, a personal digital assistant (PDA), a laptop, etc. The system 100 can typically include a sensing component 102 that can be employed to sense when a user is using the portable device and/or identify the user. As an example, while actively or passively using the portable device, a user typically touches the device. Specifically, the user can touch the keys and/or the display on the portable device and/or hold the device while actively or passively using the device. Further, the sensing component 102 can also determine the identity of the user touching the portable device by employing most any identification and/or verification technique.

The sensing component 102 can receive data from one or more sensors (not shown) on the device that indicates that the device is being touched by the user. The sensors can employ most any monitoring technique, such as, but not limited to, a skin conductivity sensing technique and/or a pressure sensing technique. Based in part on the data received from the sensors, the sensing component 102 can determine whether a user is currently using a device or not and identify/verify the user based on an analysis of the received data. Further, the sensing component 102 can send this data to a configuring component 104. Typically, users hold the portable device in their hands while actively or passively using the device. As an example, if a user is actively using a cellular phone, the user can press input keys, touch display touch screens, utilize rocker controls and/or click wheels. Further, if a user is passively using a cellular phone, for example, while watching a video, reading text, or waiting for an instant message (IM) to arrive, the user typically rests his/her fingers on the keys or anywhere on the phone. However, if the user is not using the cellular phone, he/she will place the phone, for example, in a pocket, holster or on a table etc. Thus, the fact that the user is touching the phone can be enough evidence to the sensing component 102 that the user is currently using the phone and thus the phone should remain active.

The configuring component 104 can change one or more features or functions of the portable device based on the information received from the sensing component 102. Thus, the configuring component 104 can switch between options based on whether the portable device is currently being used or not and based on the preferences of the identified user. For example, the sensing component 102 can determine that a user has currently stopped using a cell phone because the user is not touching the phone. The configuring component 104 can receive this information and change the current mode of the cell phone to a sleep mode, and/or time-out or dim the display screen to conserve battery power (e.g. as set by the identified user). As another example, when the user touches the cell phone, the sensing component 102 can determine that the identified user is now using the cell phone. Based on the data from the sensing component 102, the configuring component 104 can change the current mode of the cell phone to an active mode, and/or restore or switch on the display screen as specified by the identified user.

It can be appreciated that the subject specification is not limited to changing display screen settings but can be employed to change any other setting on the portable device. As an example, the configuring component 104 can change the current volume settings on a cellular phone based in part on the data received from the sensing component 102. According to an aspect, the sensing component 102 can determine that the user is currently touching the cellular phone and based on this data, the configuring component 104 can change the ringer volume of the phone to a lower setting or to a vibrate mode. Since, the user is in close proximity to the phone, a lower ring or vibration can be easily heard or sensed by the user and can be less intrusive method of notification. Accordingly, the sensing component 102 can facilitate passive monitoring and identification of a user and the configuring component 104 can change a setting for one or more feature of a portable electronic device even though the user is not taking an active system action based in part on the identity of the user.

Figure 2:
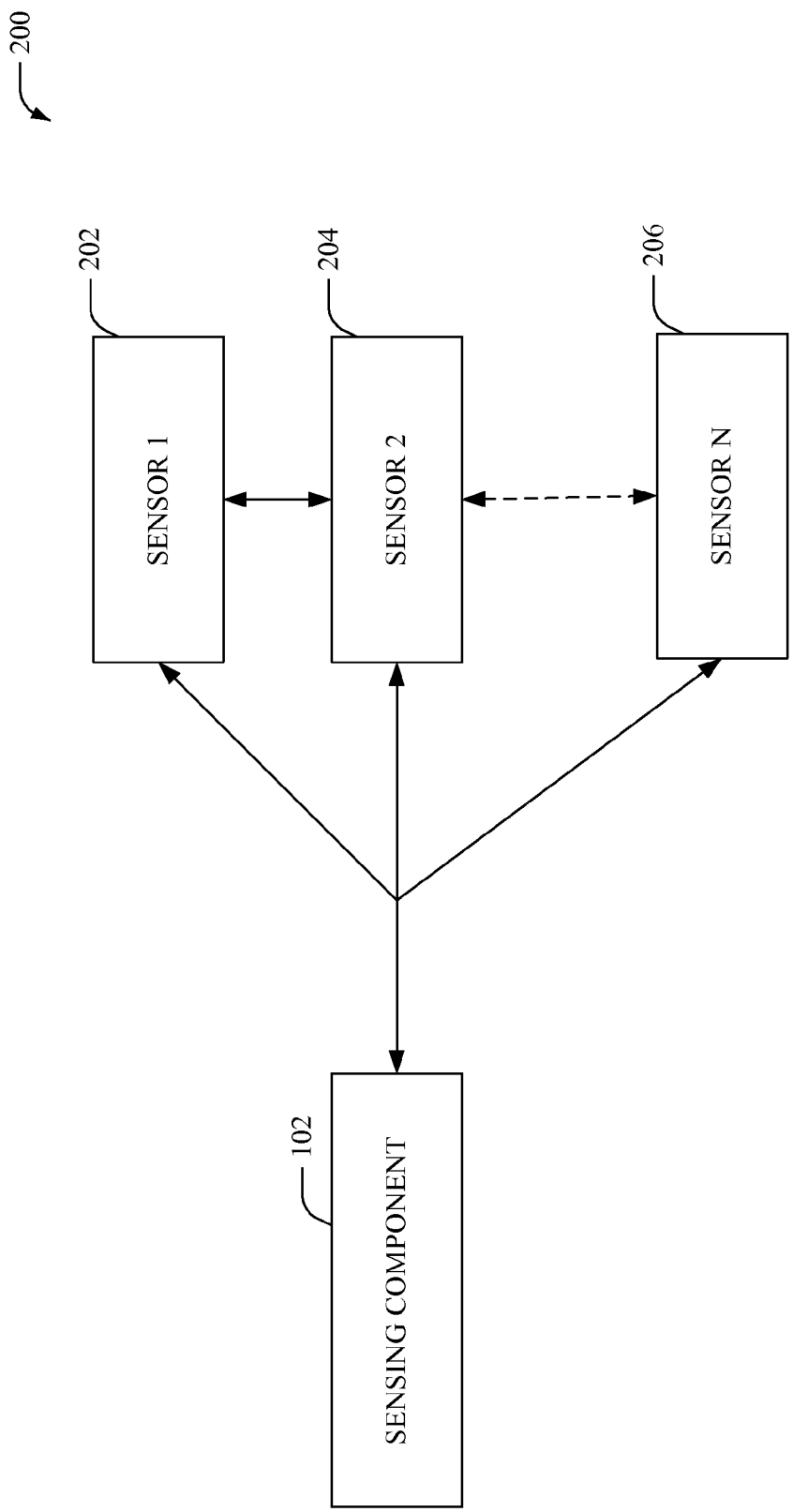
FIG. 2 illustrates an example system that can be employed to monitor whether a user is currently employing a portable electronic device in accordance with the disclosure.

Referring now to FIG. 2, there illustrated is an example system 200 that can be employed to monitor whether a user is utilizing a portable electronic device in accordance with the disclosure. The portable electronic device can include, but is not limited to, a mobile phone, an MP3 player, a portable GPS navigator, a PDA, a portable gaming module, a radio player, a media recorder, or a combination thereof. It can be appreciated that the sensing component 102 can include functionality, as more fully described herein, for example, with regard to system 100.

As seen from FIG. 2, the sensing component 102 can be connected to multiple sensors (202-206). It can be appreciated that although only three sensors are depicted in the figure, one or more sensors can be employed to monitor a user. The sensors, sensor 1 to sensor N (where N can be a natural number from one to infinity) can be employed to passively collect data that identifies whether a user is touching the portable device. Further, the sensors (202-206) can also collect information that can help the sensing component 102 determine and/or verify the identity of the user. When a user is interacting (actively) with a portable device, the user can typically touch the keys and/or the touch-screen display on the portable device. Thus, the sensors (202-206) can preferably be located on the keys and/or the display. However, when a user passively interacts with the portable device, the user can typically hold the device in his/her hand. Thus, the sensors (202-206) can be placed on the side and/or the back of the device. It can be appreciated that the sensors (202-206) can be placed anywhere on the portable device in a manner that is transparent to the user. Additionally or alternately, the sensors (202-206) can be located in a dedicated area that is visible to the user. As an example, "Touch here to activate" or "wake up device" or the like can be written over the dedicated area, such that the user can easily identify where to touch the device.

Sensors (202-206) can include, but are not limited to, skin conductivity sensors, pressure sensors, multi touch sensors, optical sensors, thermal sensors and/or a combination thereof. In an aspect, sensors (202-206) collect data that helps sensing component 102 to identify a user and determine whether the user is currently touching the portable device. The sensors (202-206) can employ the electrical conduction of the user's finger, as in capacitive touch technologies, to determine that a user is touching the phone. It can be appreciated that most any touch technology can be employed including, but not limited to, resistive, capacitive, infrared and/or surface acoustic wave (SAW) touch technology.

Resistive touch sensors are typically simple and relatively inexpensive and overall, the technology is simple. According to one aspect, sensors (202-206) can employ resistive touch technology to detect that a user is touching the portable device, for example, in cases wherein a user is wearing gloves. Various technologies that can detect touch can be employed by the sensors (202-206), such that, some can even detect near-touches without making contact. According to another aspect, sensors (202-206) can employ capacitive touch technology, wherein the capacitive sensor can includes a simple supporting sheet of glass with a conductive coating on one side. A printed circuit pattern can be employed around the outside of a viewing area. The printed circuit pattern can set a charge across the surface, which is disturbed by a conductive material, such as, a finger touching the sensor. Typically, capacitive sensing methods determine if a user is touching the portable device based on electrical disturbance. Hence, the electrical characteristics of the touching object are important. Human skin is a conductive material and the capacitive sensor can thus detect its presence. Employing capacitive touch technology in one or more of the sensors (202-206) can facilitate identification that a user has touched the portable device and reduce false alarms due to a touch by other objects. Sensors (202-206) that employ capacitive touch technology can differentiate between a touch by a conductive material and a non conductive material and accordingly reduce errors in reading human touch. As an example, if a user is currently not using a media player and has kept the player in a purse/bag, the sensors (202-206) will not identify a touch by another object in the purse/bag as the touch of the user. It can be appreciated that sensors (202-206) can be a combination of various sensors that employ different types of touch technologies.

The sensing component 102 can receive data from the various sensors (202-206) and analyze it to reduce false sensing and accurately determine when a user has touched the portable device. Further, the sensing component 102 can also determine when the user is utilizing the portable device (actively or passively) based on the analysis. In one embodiment, if the sensing component 102 receives data the sensors (202-206) that are located on the keys and/or display screen of the portable device, the sensing component 102 can determine that the user is using the device actively or passively. In another embodiment, if the sensing component 102 receives data the sensors (202-206) that are only located on the back and/or sides of the portable device, the sensing component 102 can determine that the user is merely holding the device. Accordingly, power saving features can be activated since the user is currently not using the device (neither actively nor passively). Additionally, the sensing component 102 can determine the identity of the user based on the data received from the various sensors (202-206). One or more features, including power saving features of the device, can be modified based on the preferences set by the identified user.

Figure 3:
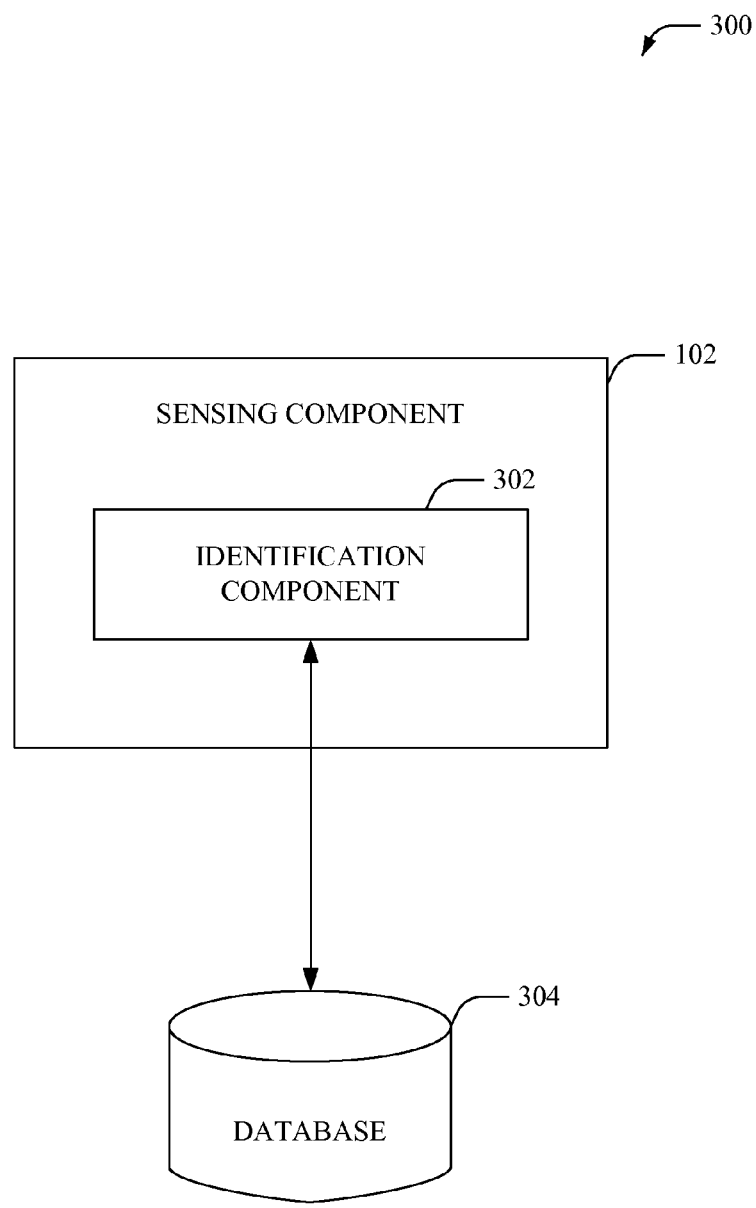
FIG. 3 illustrates an example system that can be employed to identify or verify a user of a portable electronic device, according to an aspect of subject disclosure.

FIG. 3 illustrates an example system 300 that can be employed to identify or verify a user of a portable electronic device, according to an aspect of subject disclosure. The portable electronic device can be a cellular telephone, a cordless telephone, an SIP phone, a cordless phone, a PDA, a battery operated handheld device, computing device, or other processing device, a portable media player, a portable media recorder, a camera or the like, or a combination thereof. It can be appreciated that the sensing component 102 can include functionality, as more fully described herein, for example, with regard to systems 100 and 200.

The sensing component 102 can receive skin sensitivity data associated with the user's touch from multiple sensors located on the device. The sensing component 102 can include an identification component 302 that can be employed to determine an identity of the user touching the device based in part on the data received from the sensors. It can be appreciated that the identification component 302 can be employed for identification and/or verification of a user's identity. For example, the identification component 302 can identify a user (e.g. who is touching is device?) and/or verify the identity of a user (e.g. Is user X touching the device?). In one aspect, the identification component 302 can be employed for security purposes, such that, only an authorized set of users can access the device.

The identification component 302 can employ various techniques to identify or verify a user's identity, such as, but not limited to measuring Body Mass Index (BMI), body temperature, salt level, electrical characteristic and/or a combination thereof. Additionally, most any biometric techniques can also be employed to improve accuracy. Typically, an initial setup can be performed to store information associated with a particular user that can help in identification when the user touches the device. The information can be stored in a database 304. The database 302 can comprise non-volatile memory, such as a flash memory device (e.g., single-bit flash memory, multi-bit flash memory), and/or volatile memory (e.g., static random access memory (SRAM)). Additionally, the database 302 can be internal or external to the portable electronic device.

Further, the database 304 can also store user preferences associated with each user (e.g. via an initial setup), such that, on identification of the user, the user's preferences can be activated. For example, one or more features of the portable electronic device can be modified, as predefined by a user A, when identified that user A is touching the device. Further, one or more features of the portable electronic device can be modified, as predefined by a user A, when the user A stops touching the device. Thus, the portable electronic device can be customized for each user.

According to an example, a cell phone can be customized by a user, such that the cell phone will not turn on the display unless an authorized user utilizes the phone. The identification component 302 can verify if the user touching the phone is an authorized user based in part on comparing data from the sensors to data stored in the database 304. Only when the identification component determines that the user touching the phone is an authorized user, the cell phone display will be turned on. Further, the preference settings specified by the identified user can be activated. According to one aspect, a guest profile can be assigned to unauthorized users, wherein an unauthorized user can be allowed to access a minimal number of features on the phone.

As another example, in a multiuser situation, wherein an MP3 player is shared by members of a household, the identification component 302 can identify the user touching the player and accordingly change preferences. For example, a different playlist can be provided to each member of the household. Additionally, preferences, such as, but not limited to, screen savers, background, font, volume, etc. can be customized for each member via an initial setup. Thus, when the identification component 302 identifies the user, the preferences stored by the identified user (e.g. in database 304) can be set.

Figure 4:
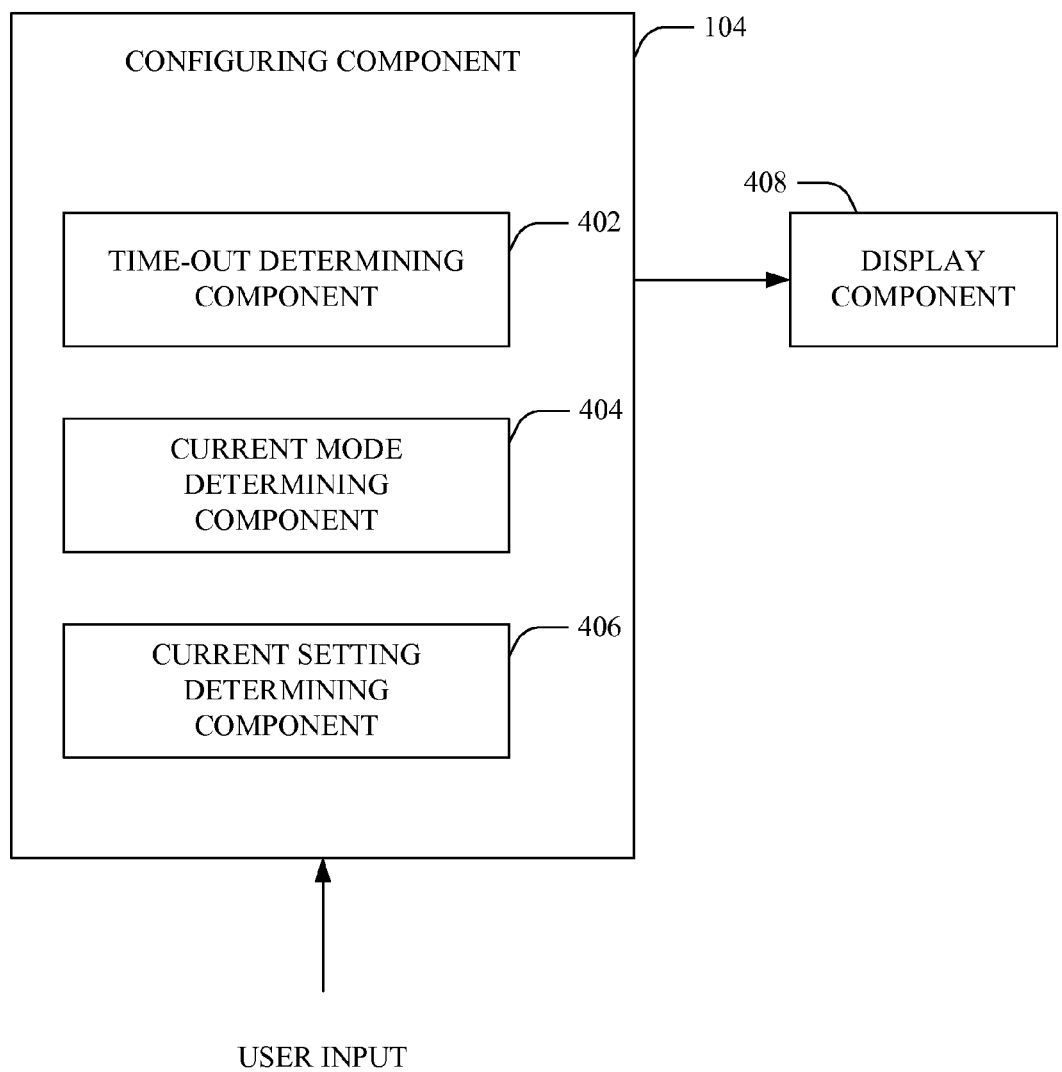
FIG. 4 illustrates an example system that can modify one or more functions on a portable electronic device in accordance with an aspect of the disclosure.

FIG. 4 illustrates an example configuring component 104 that can modify one or more functions on a portable electronic device in accordance with an aspect of the disclosure. The portable electronic device can be a cell phone, media player, camera, media recorder, etc. According to an aspect, the configuring component 104 can include a time-out determining component 402, a current mode determining component 404 and/or a current setting determining component 406. It can be appreciated that the configuring component 104 can include functionality, as more fully described herein, for example, with regard to system 100.

The time-out determining component 402 can be employed to optimize a screen time-out of the portable electronic device. Based on the data received from the sensing component 102 (FIG. 1), the time-out determining component 402 can start or stop a screen time-out. In one aspect, the time-out determining component 402 can include a time-out counter that can be set or reset according to the data obtained from the sensing component 102 (FIG. 1). Specifically, if it is determined that the user is not actively or passively using the portable device (e.g. by the sensing component 102), the time-out determining component 402 can initiate a display screen time-out. The display screen time-out can be customized for a user, for example, via an initial setup. Thus, the time-out determining component 402 can initiate the display screen time-out associated with the identified user's preferences. According to an aspect, during the time that the user is not employing the device, the time-out determining component 402 can dim or switch off a display component 408. The display component 408 can include, but not limited to, a display screen or touch screen. Further, if it is determined that the user is employing the portable device (actively or passively), the time-out determining component 402 can activate the display screen by switching on the display screen or restoring the display screen to the original brightness.

As an example, when a user is not touching an MP3 player, it can be determined that the user is not using the player (actively or passively) and the time-out determining component 402 can initiate a display screen time-out and conserve battery power as predefined by the user. Further, when the user touches, for example, a key or circle wheel on the player, the time-out determining component 402 automatically restores to the original screen settings based on the user's preference.

The current mode determining component 406 can determine a current mode for the portable electronic device based on the data received from the sensing component 102 (FIG. 1) relating to device usage. The current mode determining component 406 can determines a current mode of operation of the portable device based on the preferences of the user and whether the user is currently utilizing the portable device. According to an aspect, if the user is not using the portable device, the current mode determining component 406 can change the current mode to a preferred user mode, such as, a sleep, stand by, or low power mode to conserve battery power. According to another aspect, if the user is using the portable device, either actively or passively, the current mode determining component 406 can change the current mode to a preferred user mode, such as a normal operation mode. Thus, the current mode determining component 406 can modify the current operating mode of the portable device without an active indication from the user based on predefined user preferences.

The configuring component 104 can further include a current setting determining component 406 that modifies one or more settings of the portable device based on the device usage and predefined user settings. It can be appreciated that the settings are not limited to power saving options but can be a setting for most any feature of the portable electronic device as specified by the user. Depending on which user is utilizing the portable device and whether the user is currently using (actively or passively) the portable device, the current setting determining component 406 changes settings for one or more features or functions of the portable device. As an example, if a user is touching a cellular phone, the ringer volume can be minimized or changed to a vibrate mode by the current setting determining component 406 based on the identified user's preference setting and when the user is not touching the phone, the current setting determining component 406 can restore the original ringer volume as predefined by the identified user. This can provide a user with a less intrusive method of notification. In one aspect, the change in the settings can be predefined by a user via a user input or can be automatically determined by employing artificial intelligence and/or machine learning techniques. Therefore, a setting of the portable device can be modified by the current setting determining component 406 without an active indication from the user.

Referring now to FIG. 5, there illustrated is an example portable electronic device 500 that can optimize activation of device features based on device usage, according to an aspect of the subject disclosure. FIG. 5A depicts a front view of the portable electronic device 500, FIG. 5B depicts a side view of the portable electronic device 500 and FIG. 5C depicts a back view of the portable electronic device 500. The portable electronic device 500 can be most any mobile device including, but not limited to, a cellular telephone, a cordless telephone, an SIP phone, a cordless phone, a WLL station, a PDA, a battery operated handheld device, computing device, or other processing device, a portable media player, a portable media recorder, a camera etc.

The portable electronic device 500 typically includes a display screen 502 that can output and/or input data from a user. The display screen 502 can be a single or multiple touch screen. The display screen 502 can provide users an easy and effective means of communication with the portable electronic device 500. A sensor 504 can be provided under the display screen 502 to detect when a user touches the display 502. The sensor 504 can be a skin conductivity sensor, pressure sensor, multi touch sensor, optical sensor, thermal sensor and/or a combination thereof. The sensor 504 collects data that can determine whether a user is touching the display screen 502.

Additionally or alternatively, a sensor 506 can be placed below each key 508 on the portable electronic device 500. The sensor 506 can be employed to sense whether a user is touching one or more keys 508 on a keypad. It can be appreciated that the sensor 506 can include a skin conductivity sensor, pressure sensor, multi touch sensor, optical sensor, thermal sensor and/or a combination thereof. Further, sensors 510 employed to collect data associated with a user's touch can also be located on the sides of the portable device 500. Although only three sensors 510 are depicted in the figure, zero or more sensors can be employed. Additionally, sensors 516 can be located at the back of the portable electronic device 500 to collect data relating to a user's touch. In one aspect, sensors 504, 506, 510 and 516 can be located in a manner that is invisible to the user.

According to another aspect, a sensor 512 can be located in a dedicated area on the body of the device 500 that can be visible or known to the user. As an example, sensor 512 can be located at the bottom of the front face of the portable electronic device 500. When a user would like to use or active the device 500, the user can simply touch the sensor 512. In accordance with yet another aspect, the dedicated area on the body of the device 500 can be highlighted by displaying, for example, text such as "Touch here to active" or "wake up device", etc. as shown at 514. A sensor can be located below area 514 that can collect data based on the electrical conduction of the user's skin. Further, sensors 504, 506, 510, 512, 514 and 516, alone or in combination, can be employed to determine the identity of the user currently touching the portable electronic device 500.

Figure 6:
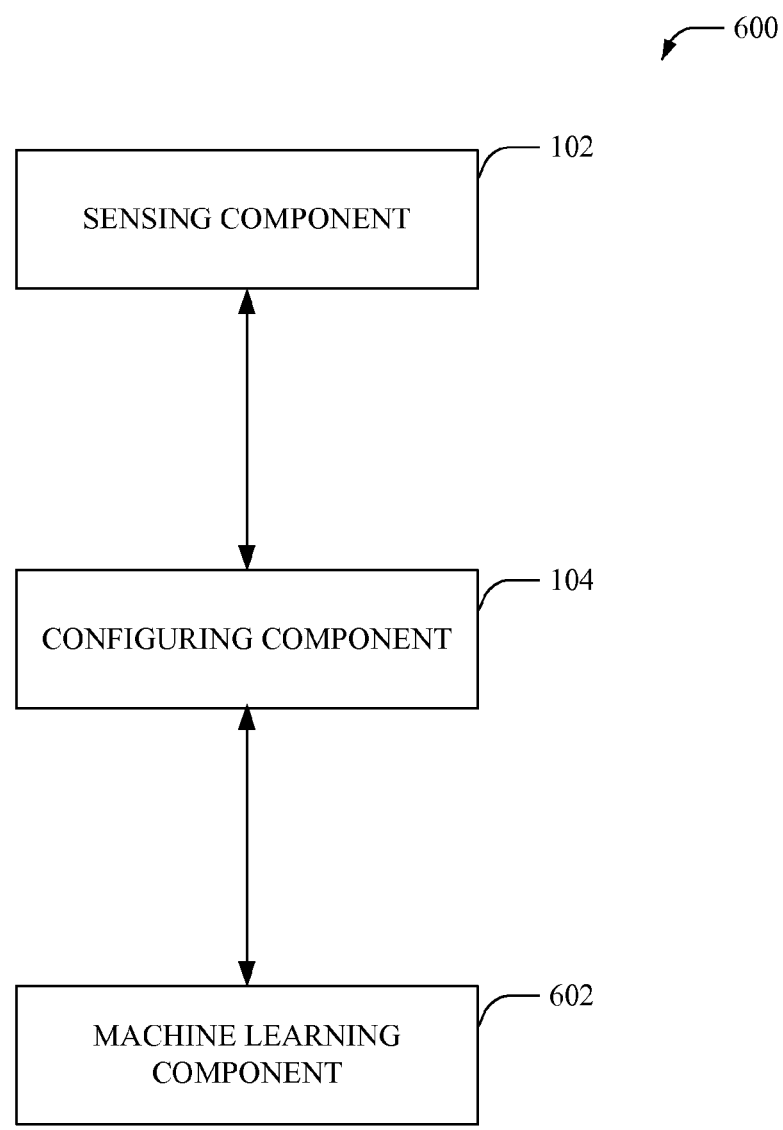
FIG. 6 illustrates an example system that can facilitate automating one or more features in accordance with the subject disclosure.

FIG. 6 illustrates an example system 600 that employs a machine learning component 602, which can facilitate automating one or more features in accordance with the subject disclosure. It can be appreciated that the sensing component 102 and configuring component 104 can each include their respective functionality, as more fully described herein, for example, with regard to systems 100, 200, 300 and 400.

The subject disclosure (e.g., in connection with optimizing screen time-out, changing current mode or settings) can employ various AI-based schemes for carrying out various aspects thereof. For example, a process for determining which setting or mode can be modified based on device usage can be facilitated via an automatic classifier system and process. Moreover, the classifier can be employed to determine which mode or setting will be selected as a current mode or setting based on historical data and/or preferences. Additionally, the classifier can be employed to identify the user touching the device and/or the preferences of the identified user.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject disclosure can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria, which settings should be changed based on usage of the portable device or what value should the selected settings change by, or optimizing display screen time-out etc.

FIGS. 7-10 illustrate methodologies and/or flow diagrams in accordance with the disclosed subject matter. For simplicity of explanation, the methodologies are depicted and described as a series of acts. It is to be understood and appreciated that the subject disclosure is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 7:
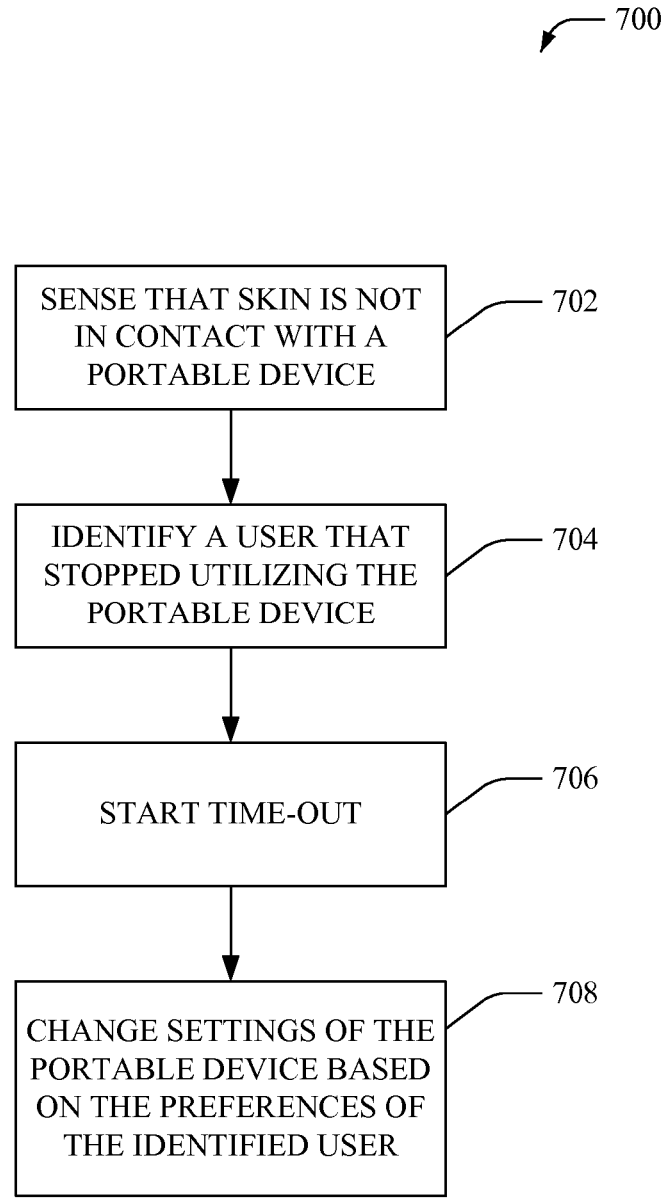
FIG. 7 illustrates an example methodology that can be employed to change settings on an electronic portable device when a user is not touching the device in accordance with an aspect of the disclosed subject matter.

Referring now to FIG. 7, illustrated is an example methodology 700 that can be employed to change settings of an electronic portable device when a user is not touching the device in accordance with an aspect of the disclosed subject matter. The portable electronic device can be most any mobile device that is typically powered by a battery within the device. At 702, it can be sensed that a user's skin is no longer in contact with the portable electronic device. As an example, one or more sensors can be employed to continuously monitor a user's touch. At 704, the user that stopped utilizing the device can be identified based in part on data collected by sensors when the user was touching the phone. According to one aspect, when the user is not touching the device, the device can switch to an inactive state. Thus, at 706, a time-out can be started such that, a display screen on the portable electronic device can be either dimmed or switched off to conserve battery power based on preferences set by the identified user. Additionally, most any power saving features can be activated depending on the user's preferences. At 708, one or more settings of the portable device can be changed as per the preferences of the identified user. As an example, a setting such as, but not limited to, a speaker volume and/or a ringer volume can be increased.

Figure 8:
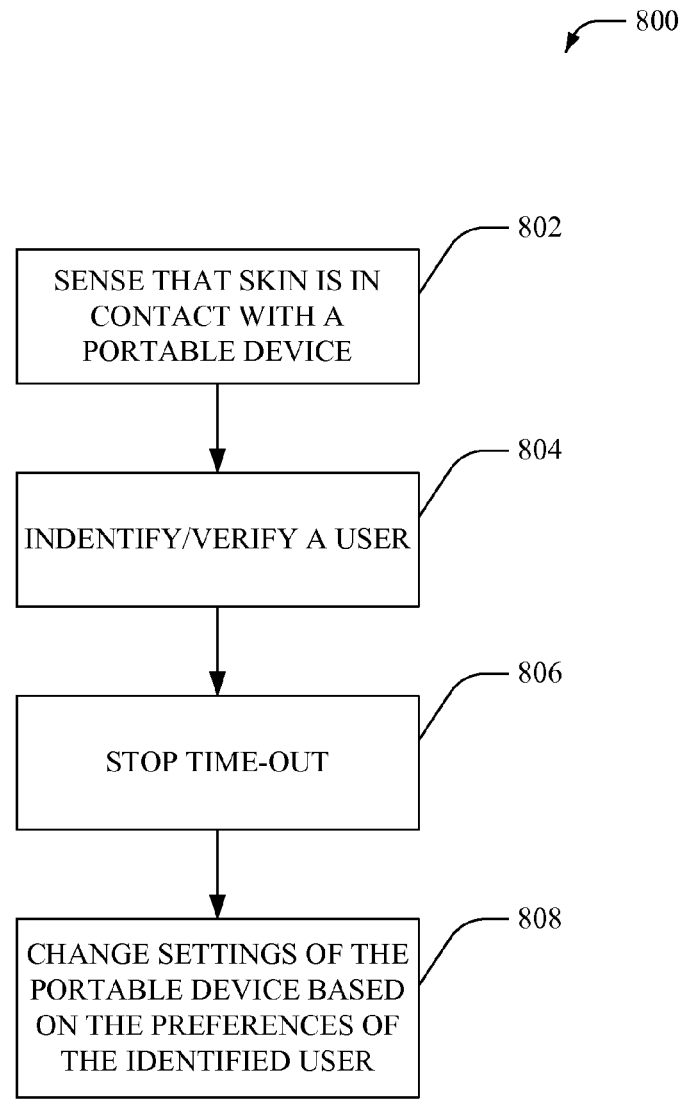
FIG. 8 illustrates an example methodology that can be employed to change settings on an electronic portable device when a user is touching the device, according to an aspect of the disclosed subject specification.

Referring to FIG. 8, illustrated is an example methodology 800 that can be employed to change settings on an electronic portable device when a user is touching the device, according to an aspect of the disclosed subject specification. The portable electronic device can be a cellular phone, media player, media recorder, etc. At 802, it can be sensed that a user's skin is in contact with the portable electronic device. As an example, one or more sensors located on the portable device can be employed to continuously monitor a user's touch. At 804, the identity of the user can be determined and/or verified. At 806, a time-out can be stopped and a display screen on the portable device can be switched on or restored to its original brightness based in part on the identified user's preferences. At 808, most any setting on the portable device can be changed or reset to an original value as predefined by the identified user in view of the fact that the user is currently using the device. The setting can be a power management feature, or most any feature of the device, such as but not limited to a speaker volume or ringer volume. Additionally or alternately, the changes to the settings can be automatically determined by employing artificial intelligence techniques.

Figure 9:
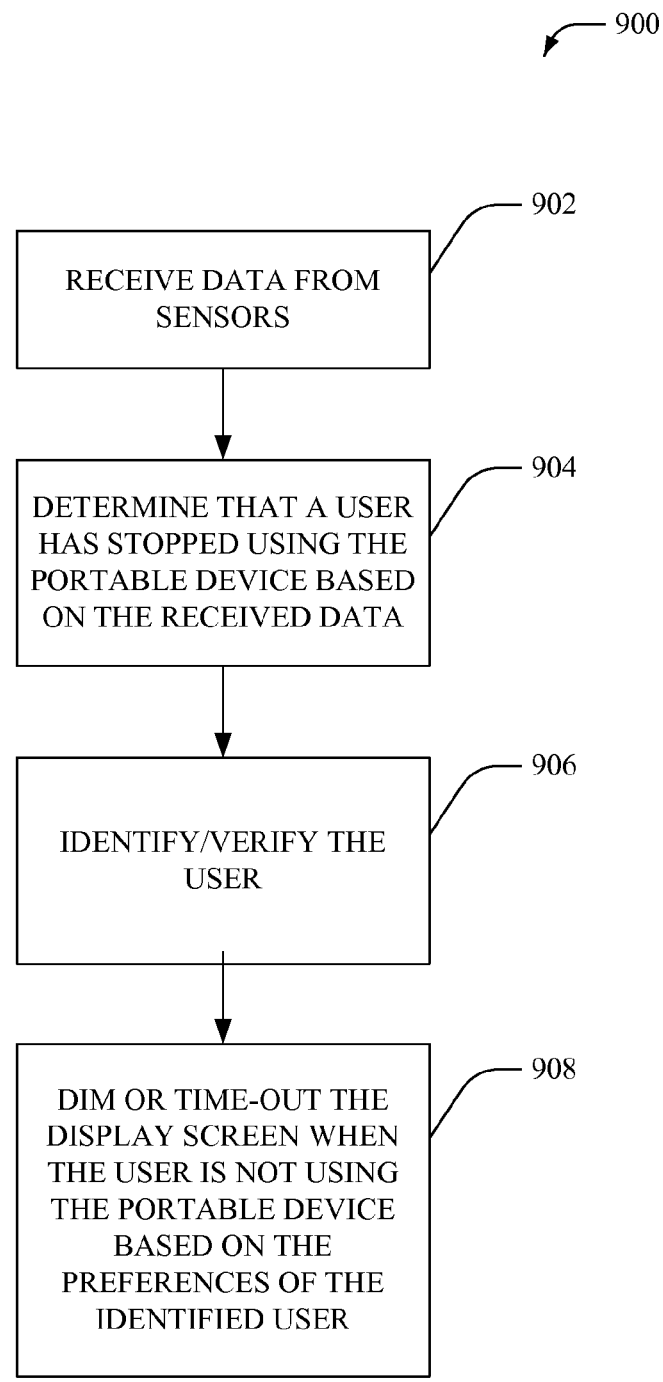
FIG. 9 illustrates an example methodology to initiate a screen time-out when a user is not using a portable electronic device, according to an aspect of the subject disclosure.

FIG. 9 illustrates an example methodology 900 to initiate a screen time-out when a user is not using a portable electronic device, according to an aspect of the subject disclosure. At 902, data can be received from one or more sensors that are located on the portable electronic device. The data is associated with a user's touch, which can be passively monitored and/or detected by the sensors. The sensors can be located anywhere on the portable device in a manner that is transparent to the user and/or at a dedicated area that is visible to the user. As an example, data can be received from multiple skin conductivity sensors on the portable device. At 904, it can be determined that the user has stopped using (actively and passively) the portable device based in part on the received data. At 906, the identity of the user can be determined. At 908, a display screen on the portable electronic device can be dimmed or timed-out to preserve battery power based on the identified user's predefined settings. Thus, the display screen time-out can be optimized based on device usage by a particular user, which is determined by the user's touch. Additionally, time-out can be customized for each user.

Figure 10:
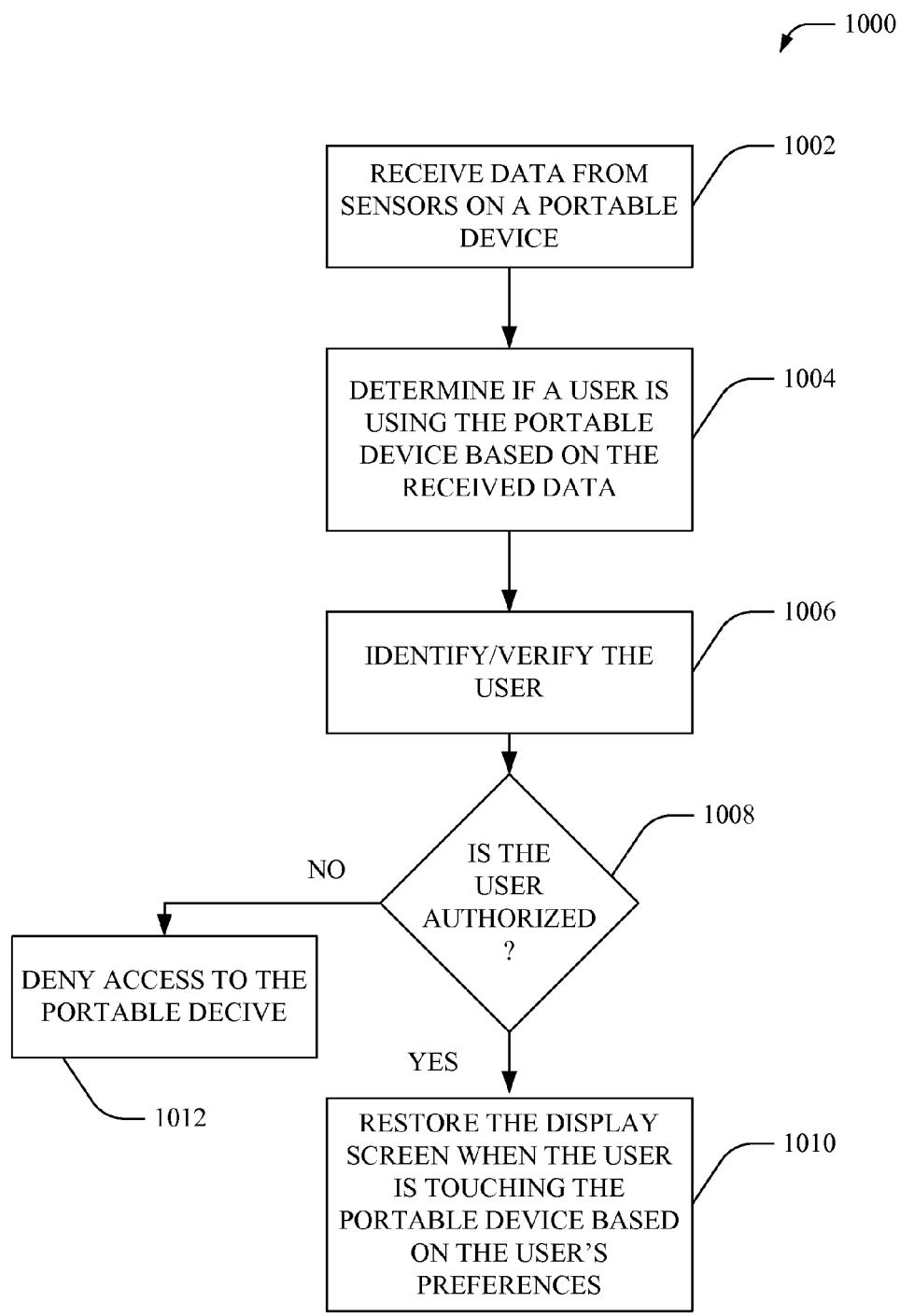
FIG. 10 illustrates an example methodology to restore a display screen to its active state when a user is using a portable electronic device in accordance with an aspect of the subject disclosure.

Referring now to FIG. 10, there illustrated an example methodology 1000 to restore a display screen to its active state when a user is using a portable electronic device in accordance with an aspect of the subject specification. At 1002, data can be received from one or more sensors that are located on the portable electronic device. The sensors can be located anywhere on the portable device and can collect data is associated with a user's touch, for example, via skin conduction. At 1004, it can be determined that the user is currently using the portable device based in part on the received data. The user can employ the portable device actively or passively. At 1006, an identity of the user can be determined and/or verified. According to an aspect, various techniques can be employed to identify and/or verify a user's identity, such as, but not limited to measuring Body Mass Index (BMI), body temperature, salt level, electrical characteristic and/or a combination thereof. At 1008, a determination is made whether the identified user is authorized to employ the portable device or not. If determined that the identified user is an authorized user, a display screen on the portable electronic device can be activated or restored to its original brightness as per the user's preferences, as shown at 1010. However, if determined that the identified user is not an authorized user, access to the portable device can be denied as shown at 1012. In one aspect, unauthorized users can be granted access to minimal features of the device. Accordingly, the methodology 1000 can facilitate customizing display screen time-out based on device usage for a user, which can be determined data obtained from skin conductivity sensors.

Figure 11:
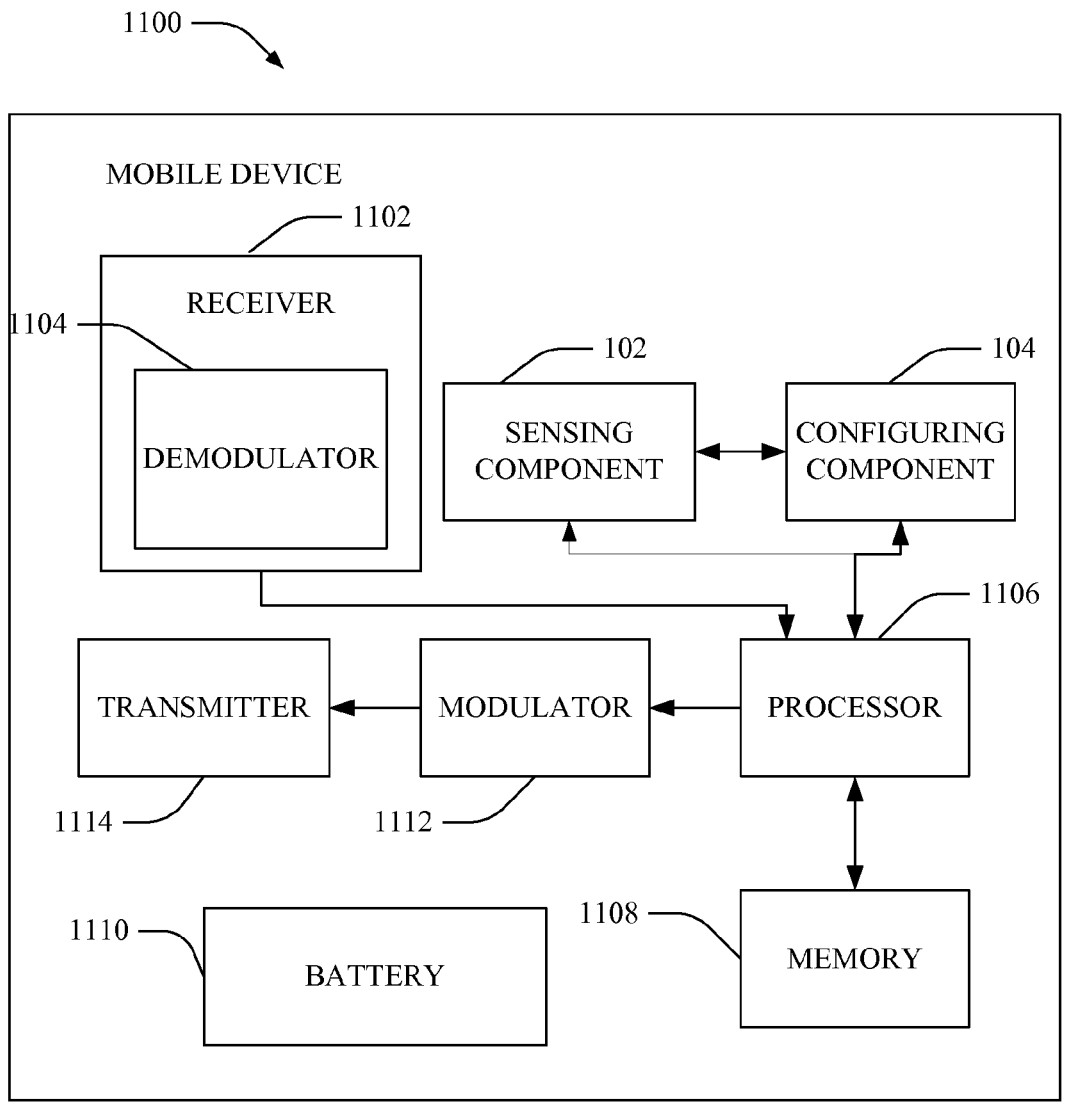
FIG. 11 is an illustration of an example mobile device that can optimize a change in device settings based on data obtained from touch sensitive sensors, in accordance with an aspect of the system.

FIG. 11 is an illustration of an example mobile device 1100 that can optimize a change in device setting based on data obtained from touch sensitive sensors, in accordance with an aspect of the system. It can be appreciated that components of FIG. 11 (1102-1114) can be optional and/or can be combined into a single component providing aggregate functionality. Further, it can be appreciated that the sensing component 102 and configuring component 104 can each include their respective functionality, as more fully described herein, for example, with regard to systems 100, 200, 300, 400 and 600.

Mobile device 1100 can comprise a receiver 1102 that receives a signal from, for instance, a receive antenna (not shown), and performs typical actions thereon (e.g., filters, amplifies, downconverts, etc.) the received signal and digitizes the conditioned signal to obtain samples. Receiver 1102 can be, for example, an MMSE receiver, and can comprise a demodulator 1104 that can demodulate received symbols and provide them to a processor 1106 for channel estimation. Processor 1106 can be a processor dedicated to analyzing information received by receiver 1102 and/or generating information for transmission by a transmitter 1116, a processor that controls one or more components of mobile device 1100, and/or a processor that both analyzes information received by receiver 1102, generates information for transmission by transmitter 1114, and controls one or more components of mobile device 1100.

Mobile device 1100 can additionally comprise memory 1108 that is operatively coupled to processor 1106 and that may store data to be transmitted, received data, information related to available channels, data associated with analyzed signal and/or interference strength, information related to an assigned channel, power, rate, or the like, and any other suitable information for estimating a channel and communicating via the channel. Memory 1108 can additionally store protocols and/or algorithms associated with estimating and/or utilizing a channel (e.g., performance based, capacity based, etc.). Further, memory 1108 can also store user preferences and/or predefined user settings.

It will be appreciated that the data store (e.g., memory 1108) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 of the subject systems and methods is intended to comprise, without being limited to, these and any other suitable types of memory.

Mobile device 1100 still further comprises a modulator 1112 and a transmitter 1114 that transmits a signal to, for instance, a base station, another mobile device, etc. The modulator 1112 can be employed to multiplex the signal to be transmitted in the frequency and/or time domain. A battery 1110 can be employed to power the mobile device 1100. Power management techniques can be employed to save battery power, such that the battery can last longer between recharge cycles. The sensing component 102 and the configuring component 104 can optimize and/or customize power management features, for example, screen time-out to conserve battery power for a user employing the device. In particular, the sensing component 102 can passively sense when a user is using the mobile device 1100 (actively or passively) and identify the user, and the configuring component 104 can configure the device 1100 in an active state during that time period based on the identified user's preferences. According to an aspect, a screen time-out can be started and stopped based on device usage, without an active indication from a user.

Figure 12:
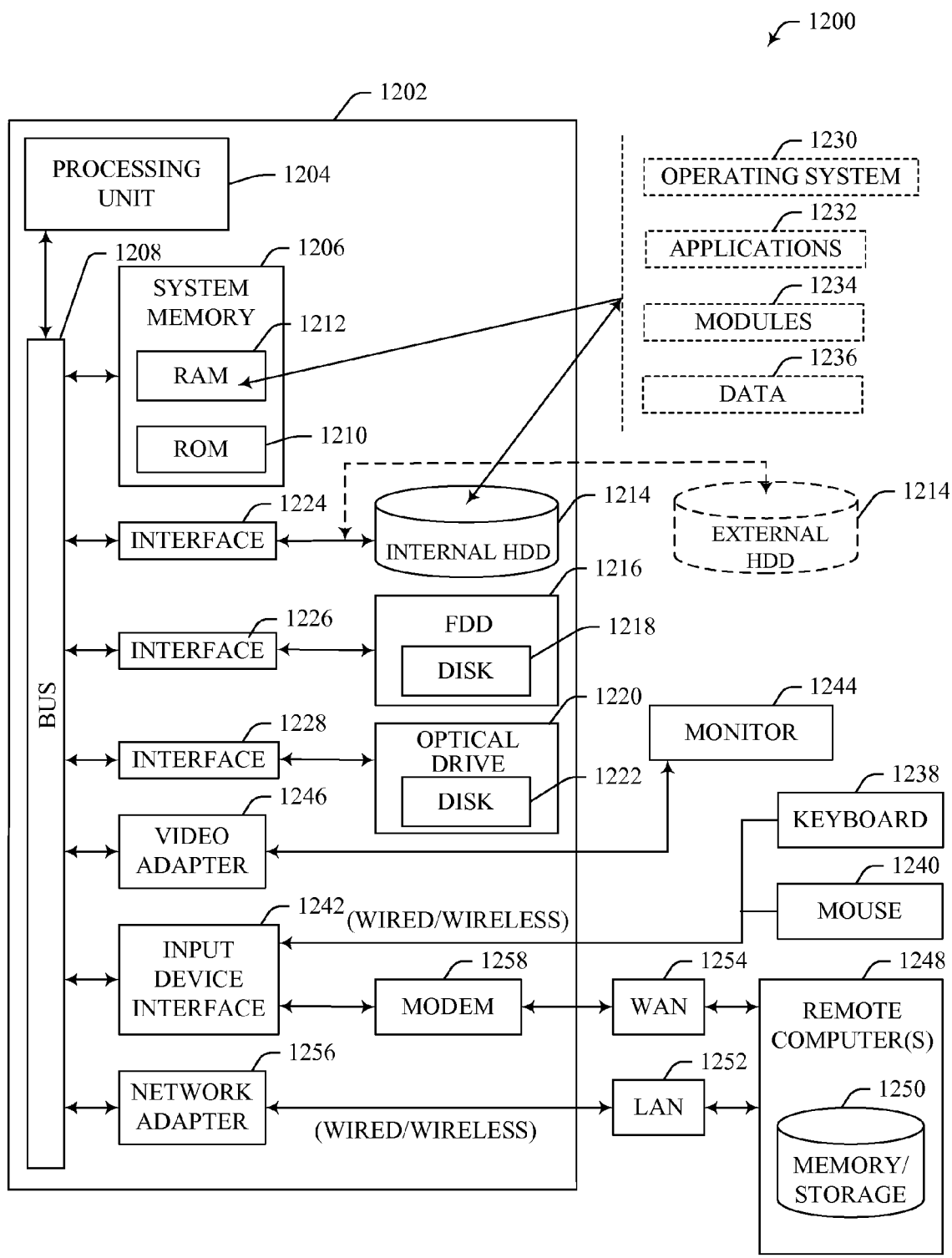
FIG. 12 illustrates is a schematic block diagram depicting a suitable operating environment in accordance with an aspect of the subject disclosure.

In order to provide a context for the various aspects of the disclosed subject matter, FIG. 12 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject disclosure also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the disclosed specification can be practiced on stand-alone computers. In a distributed computing environment, program modules may be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the example environment 1200 for implementing various aspects of the specification includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the specification can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are example and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A user equipment, comprising:
a processor; and
a memory that stores executable instructions that, when executed by the processor, facilitate performance of operations, comprising:
based on touch data received from a first sensor of the user equipment, determining that the user equipment is not being actively utilized and not being passively utilized;
in response to the determining that the user equipment is not being actively utilized and not being passively utilized, initiating a display time-out of the user equipment, wherein the display time-out is customized based on identity data that is indicative of a user identity that last utilized the user equipment and that is determined based on thermal data received from a second sensor of the user equipment;
in response to the determining, initiating by an artificial intelligence, a mode change of the user equipment resulting in a changed mode;
determining other identity data indicative of another user identity based on other touch data received from the first sensor of the user equipment; and
based on determining that the other user identity is not an authorized user identity, granting a limited access to a feature of the user equipment.

2. The user equipment of claim 1, wherein the operations further comprise:
customizing the display time-out based on preference data received during a setup procedure executed via the user equipment.

3. The user equipment of claim 1, wherein the initiating the display time-out comprises modifying a brightness of a display screen of the user equipment.

4. The user equipment of claim 1, wherein the operations further comprise:

based on the determining that the user equipment is not being actively utilized and not being passively utilized and the identity data, modifying the changed mode of the user equipment.

5. The user equipment of claim 4, wherein the modifying comprises changing a vibration mode of the user equipment.

6. The user equipment of claim 4, wherein the modifying comprises changing a ringer volume for an incoming notification that is to be received by the user equipment.

7. The user equipment of claim 1, wherein the identity data is determined based on measurement data indicative of a body temperature of the user identity.

8. The user equipment of claim 1, wherein the identity data is determined based on measurement data indicative of a body mass index of the user identity.

9. The user equipment of claim 1, wherein the first sensor comprises a sensor that measures a conductivity of skin of the user identity.

10. The user equipment of claim 1, wherein the second sensor comprises a sensor that measures changes in heat.

11. A method, comprising:
based on conductivity data received from a first sensor of a mobile device comprising a processor, verifying, by the mobile device, that the mobile device is not being actively utilized and not being passively utilized;
based on thermal data received from a second sensor of the mobile device, determining, by the mobile device, identity data that is indicative of a user identity that last utilized the mobile device;
in response to the determining and the verifying, customizing, by the mobile device, a time-out period for a display of the mobile device;
in response to the verifying, restoring, by the mobile device, a power management setting of the device based on an artificial intelligence;
based on other thermal data received from the second sensor of the mobile device, identifying other identity data indicative of another user identity that has utilized the mobile device, wherein the identifying comprises identifying that the other user identity is not an authorized user identity; and
in response to the identifying, restricting access to a feature of the mobile device.

12. The method of claim 11, wherein the customizing comprises modifying a brightness of the display.

13. The method of claim 11, wherein the customizing comprises modifying a vibration mode of the mobile device.

14. The method of claim 11, wherein the customizing comprises customizing the time-out period based on preference data received during a setup procedure implemented by the mobile device.

15. The method of claim 11, wherein the determining comprises determining the identity data based on body mass index data.

16. The method of claim 11, wherein the determining comprises determining the identity data based on body temperature data.

17. The method of claim 11, wherein the determining comprises determining the identity data based on salt level data.

18. A non-transitory machine-readable storage medium, comprising executable instructions that, when executed by a processor, facilitate performance of operations, comprising:
based on first measurement data received from a conductivity sensor of a communication device verifying that the communication device is not being actively utilized and not being passively utilized;
based on second measurement data received from a thermal sensor of the communication device, determining identity data that is indicative of a user identity that last touched the communication device;
in response to the determining, facilitating a time-out period for a display of the communication device, wherein the time-out period is customized based on the identity data;
in response to the determining and the verifying, adjusting a setting of the communication device by an artificial intelligence;
based on third measurement data received from the conductivity sensor and based on fourth measurement data received from the thermal sensor, identifying another user identity that has touched the communication device and that is an unauthorized user identity; and
in response to the identifying, restricting use of the setting of the communication device.

19. The non-transitory machine-readable storage medium of claim 18, wherein a functionality of the communication device is customized based on the identity data during the time-out period.

20. The non-transitory machine-readable storage medium of claim 18, wherein a mode of operation of the communication device is customized based on the identity data during the time-out period.

* * * * *